United States Patent
Konno et al.

(10) Patent No.: US 7,282,162 B2
(45) Date of Patent: Oct. 16, 2007

(54) TERMINAL ELECTRODE COMPOSITIONS FOR MULTILAYER CERAMIC CAPACITORS

(75) Inventors: Takuya Konno, Tochigi-ken (JP); Takayuki Kaneda, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 75 days.

(21) Appl. No.: 11/430,534

(22) Filed: May 9, 2006

(65) Prior Publication Data

US 2006/0202173 A1 Sep. 14, 2006

Related U.S. Application Data

(62) Division of application No. 10/671,308, filed on Sep. 25, 2003, now Pat. No. 7,074,349.

(60) Provisional application No. 60/442,203, filed on Jan. 24, 2003.

(51) Int. Cl.
*H01B 1/22* (2006.01)
*H01L 29/12* (2006.01)

(52) U.S. Cl. ...................... 252/512; 257/532

(58) Field of Classification Search ............ 252/512, 252/513; 427/97.1, 99.2, 125; 257/532
See application file for complete search history.

(56) References Cited

U.S. PATENT DOCUMENTS

| | | | |
|---|---|---|---|
| 3,516,949 A | 6/1970 | Hoffman | |
| 3,922,387 A | 11/1975 | Larry | |
| 4,451,869 A | 5/1984 | Sakabe et al. | |
| 4,880,567 A | 11/1989 | Prabhu et al. | |
| 5,047,313 A * | 9/1991 | Nebe et al. | 430/281.1 |
| 5,645,765 A | 7/1997 | Asada et al. | |
| 5,688,441 A | 11/1997 | Itagaki et al. | |
| 5,781,402 A | 7/1998 | Fujiyama et al. | |
| 5,972,564 A * | 10/1999 | Kawana et al. | 430/281.1 |

FOREIGN PATENT DOCUMENTS

| | | |
|---|---|---|
| EP | 0 132 610 A1 | 2/1985 |
| EP | 1 122 220 A1 | 8/2001 |
| JP | 2001307549 A | 11/2001 |
| JP | 02002080675 * | 3/2002 |

* cited by examiner

*Primary Examiner*—Mark Kopec

(57) ABSTRACT

The present invention relates to terminal electrode compositions for multilayer ceramic capacitors. More specifically, it relates to terminal electrode compositions for multilayer ceramic capacitors, which compositions are made of a copper-based powder and an organic binder that can be fired at a low temperature in a nitrogen atmosphere.

2 Claims, No Drawings

TERMINAL ELECTRODE COMPOSITIONS FOR MULTILAYER CERAMIC CAPACITORS

This application is a DIV of 10/671,308 (filed Sep. 25, 2003, now U.S. Pat. No. 7,074,349), which application claims benefit of 60/442,203 (filed Jan. 24, 2003).

FIELD OF THE INVENTION

The present invention relates to terminal electrode thick film compositions for multilayer ceramic capacitors. More specifically, it relates to terminal electrode compositions for multilayer ceramic capacitors (MLC), which compositions are made of a metal-based powder dispersed in an inert liquid organic medium, which is fireable at a low temperature in a neutral or reducing atmosphere.

BACKGROUND OF THE INVENTION

Electrically conductive pastes composed of a base metal such as copper or nickel dispersed with an inorganic binder and an organic binder dispersed in a solvent are widely used as terminal electrode compositions for multilayer ceramic capacitors. These conductive paste compositions are typically fired in a neutral or reducing atmosphere (such as nitrogen) to suppress oxidation of the constituent metal and internal electrode. Accordingly, of the ingredients contained in the paste, it is necessary for the organic binder which must be burned off in the firing step to have sufficient thermal decomposability in this type of atmosphere. Various types of acrylic polymers are well suited for this purpose. For instance, JP-A 2001-307549 describes examples in which compounds such as methyl methacrylate, ethyl methacrylate and butyl methacrylate are used.

However, prior-art electrically conductive pastes have the following drawbacks. The fired film must have a thickness which is sufficiently low to satisfy the chip specifications and achieve good reliability during mounting. For example, at chip dimensions of 1.2 mm (width)×1.2 mm (thickness)×2.0 mm (length), a terminal film thickness of not more than 90 microns is appropriate. The method ordinarily used to control the film thickness within this range is a step called "blotting," in which excess paste is removed after coating. However, this increases costs due to the increased manufacturing tact time it represents and the increase in man-hours required to recycle the paste that is removed.

Approaches that have been tried in order to eliminate blotting include that of optimizing the paste characteristics to enable the application of a thinner film. One such method has involved reducing the paste viscosity so as to lower the amount of paste deposited to the element assembly of the MLC. However, the low viscosity allows the paste to sag on the sidewalls, preventing the shape to be maintained.

Moreover, although film thickness-reducing effects can be expected with the use of a method for lowering the inorganic solids content within the paste, there is a corresponding increase in organic binder and thinner components, which lowers the viscosity. Increasing the amount of organic binder to check this decline in viscosity will ensure that a suitable viscosity is achieved, but an excessive increase in the amount of organic binder per unit volume harms thermal decomposability of the organic binder fired in a neutral or reducing atmosphere.

It is therefore an object of the invention to provide a thick film paste composition for terminal electrodes, which composition has a reduced solids content yet maintains a suitable paste viscosity and is able to ensure sufficient thermal decomposability of the organic binder.

DETAILED DESCRIPTION OF THE INVENTION

The conductive thick film paste composition of the invention comprises a specified amount of a methyl methacrylate polymer having a suitable molecular weight, the solids within the paste composition can be lowered to 75 wt % or less (e.g., 70 wt %), making it possible to reduce the film thickness and thus form the desired terminal electrodes. The invention is described more fully below.

The organic medium is preferably one prepared by the dissolution of an acrylic polymer within a suitable solvent. The polymer has a high thermal decomposability within a neutral or reducing atmosphere.

The polymer used in the invention is methyl methacrylate, but the methyl methacrylate may be combined with polymers selected from ethyl methacrylate and butyl methacrylate, and copolymers of acrylate compounds, and blends of these listed above.

The ratio of inert medium to solids in the composition may vary considerably and depends upon the manner in which the dispersion of the solids in medium is to be applied. Dispersion contains 45 to 76 wt % solids and 24 to 55 wt % medium.

Accordingly, the invention provides a terminal electrode composition for multilayer capacitors, which composition comprises 30 to 71 wt % of a conductive powder selected from copper powder, nickel powder and copper-nickel alloy powder dispersed in an organic binder in solvent such as CARBITOL® acetate and butyl CARBITOL® acetate (CARBITOL® is a registered trademark of Union Carbide Chemicals & Plastics Technology Corporation), wherein the organic binder is composed of one or more types of methyl methacrylate (MMA) polymer dissolved in an organic solvent, at least one of the methyl methacrylate polymers having a number-average molecular weight of at least 100,000 and a weight-average molecular weight of at least 1,000,000, such that the methyl methacrylate polymer accounts for 2.0 to 9.0 wt % of the paste, based on total composition.

To remove the organic medium, suitable oxygen doping in the nitrogen firing furnace is ordinarily carried out within a thermal decomposition temperature range of 150 to 450° C. The methyl methacrylate polymer content for carrying out sufficient thermal decomposition is not more than 9.0 wt %, and preferably not more than 7.0 wt %, based on the total paste. At a methyl methacrylate polymer content of more than 9.0 wt %, the polymer content per unit volume becomes to high for the amount of oxygen supplied. As a result, the level of unburned organic residues rises, which can cause sintering defects.

The organic medium confers a viscosity which allows the paste to be deposited on a substrate in an appropriate shape, and also maintains the strength of the dried coating. The use of a methyl methacrylate polymer is especially preferable for achieving a sufficient dry coat strength even when the polymer is used in a small amount. The use of less than 2.0 wt % results in an excessive decrease in the viscosity, preventing a sufficient dry film strength.

In the practice of the invention, the base metal particles are selected from a copper powder, a nickel powder or a copper-nickel alloy powder. A copper powder is preferred. Copper powder particles are selected from spherical or of indeterminate shape and have an average particle size of 0.5 to 30 μm, and flake-like copper particles having a particle size of 0.1 to 30 μm, and mixtures thereof. Base metal particles that are too large compromise the density of the terminal electrode produced therefrom. On the other hand, if the particle size is too small, the dispersion properties differ from those of the organic medium, giving rise to a change in rheology which makes it difficult to achieve an ideal coated shape.

The content of base metal particles within the paste is 30 to 71 wt %. Below this range, a dense sintered film is not obtained; whereas above this range, the desired paste viscosity is not achieved.

Illustrative, preferred, non-limiting examples of the glass frit used in the present invention include those composed of Si—B—Ba glass, Si—B—Pb glass and Si—B—Zn glass. The softening point of the glass frit as an inorganic binder is closely associated with the firing temperature. Too high a softening point inhibits sintering, whereas too low a softening point promotes sintering. The firing temperature of the paste according to the invention is about 700 to 950° C. Hence, when firing is carried out at about 750° C., for example, to keep the composition from undergoing an excessive degree of sintering yet allow it to achieve a suitable degree of density, it is preferable for the glass softening point be set within a range of 500 to 650° C.

The paste composition has a glass frit content from 5 to 15 wt %, and preferably from 8 to 12 wt %, based on the overall composition. When too little glass frit is added, a fired film having sufficient density to serve as a barrier to the plating solution cannot be obtained, and adhesion to the capacitor assembly is inadequate. On the other hand, the addition of too much glass frit causes glass components to rise to the surface of the fired film, greatly compromising the plating adhesion. The glass frit is preferably a finely divided powder having a particle size of 0.5 to 20 µm, and especially 1 to 10 µm. Too large a particle size results in a low density, whereas too small a particle size results in dispersion properties that differ from those of the organic binder, altering the rheology and making it difficult to achieve an ideal coated shape.

In the practice of the invention, the above-described base metal particles and glass frit are dispersed in an organic medium to form a paste composition. The composition is coated onto a terminal electrode-forming site of a multilayer ceramic capacitor. It is then fired at a temperature of 700 to 950° C. to form terminal electrodes. Nickel or solder plating is then applied as a soldering surface to the terminal electrodes after they have been fired, thereby giving finished terminal electrodes.

By including within the paste 2.0 to 9.0 wt % of at least one type of methyl methacrylate polymer having a weight-average molecular weight of at least 1,000,000, an electrically conductive paste is obtained that has an adequate dry coat strength, is free of paste sagging at end faces even at a low solids content, and has sufficient thermal decomposability of the organic components when fired in a neutral or reducing atmosphere, and is free of adverse effects upon sintering by unburned organic matter.

EXAMPLES

Examples of the invention and comparative examples are given below. All percentages are based on total composition.

Example 1

A methyl methacrylate polymer having a weight-average molecular weight of 1,200,000 (22 wt %) was dissolved in butyl CARBITOL® acetate (78 wt %) to form an organic medium. 30 wt % of the above organic medium, 63 wt % of spherical copper powder having an average particle size of 3 µm and 7 wt % of Si—B—Ba glass frit were each weighed out in the indicated amounts and uniformly dispersed by blending in a three-roll mill to form a paste.

The Si—B—Ba glass frit had the composition by weight:

| 35.0% | BaO |
| 23.1% | $B_2O_3$ |
| 13.5% | SrO |
| 12.5% | $SiO_2$ |
| 4.5% | ZnO |
| 3.7% | MgO |
| 2.4% | $Al_2O_3$ |
| 2.3% | $Na_2O$ |
| 1.2% | $SnO_2$ |
| 1.0% | $TiO_2$ |
| 0.4 | $K_2O$ |
| 0.4% | LiO |

Example 2

15 wt % a methyl methacrylate polymer having a weight-average molecular weight of 1,200,000 (22 wt %) was dissolved in butyl CARBITOL® acetate (78 wt %), 10.5 wt % methyl methacrylate having a weight-average molecular weight of 200,000 dissolved in butyl CARBITOL® acetate formed the organic vehicle, 67 wt % of spherical copper powder having an average particle size of 3 µm and 7.5 wt % of Si—B—Ba glass frit of Example 1 were each weighed out in the indicated amounts and uniformly dispersed by blending in a three-roll mill to form a paste.

Example 3

15 wt % of a methyl methacrylate polymer having a weight-average molecular weight of 1,200,000 (22 wt %) was dissolved in butyl CARBITOL® acetate (78 wt %), 10.5 wt % methyl methacrylate-butyl methacrylate copolymer having a weight-average molecular weight of 150,000 was dissolved in butyl CARBITOL® acetate (78 wt %) to form an organic vehicle, 67 wt % of spherical copper powder having an average particle size of 3 µm and 7.5 wt % of Si—B—Ba glass frit of Example 1 were each weighed out in the indicated amounts and uniformly dispersed by blending in a three-roll mill to form a paste.

Comparative Example 1

30 wt % butyl methacrylate polymer having a weight-average molecular weight of 680,000 (22 wt %) was dissolved in butyl CARBITOL® acetate (78 wt %) to form an organic vehicle of the above organic vehicle, 63 wt % of spherical copper powder having an average particle size of 3 µm and 7 wt % of Si—B—Ba glass frit of Example 1 were each weighed out in the indicated amounts and uniformly dispersed by blending in a three-roll mill to form a paste.

Comparative Example 2

30 wt % methyl methacrylate polymer having a weight-average molecular weight of 200,000 (22 wt %) was dissolved in butyl CARBITOL® acetate (78 wt %) to form an organic vehicle, 63 wt % of spherical copper powder having an average particle size of 3 µm and 7 wt % of Si—B—Ba glass frit of Example 1 were each weighed out in the indicated amounts and uniformly dispersed by blending in a three-roll mill to form a paste.

Comparative Example 3

16.7 wt % methyl methacrylate polymer having a weight-average molecular weight of 200,000 (22 wt %) was dissolved in butyl CARBITOL® acetate (78 wt %) to form an organic vehicle, 75 wt % of spherical copper powder having an average particle size of 3 μm and 8.3 wt % of Si—B—Ba glass frit of Example 1 were each weighed out in the indicated amounts and uniformly dispersed by blending in a three-roll mill to form a paste.

TEST METHODS

Evaluation Tests:

The pastes formulated as described above were coated onto multilayer ceramic capacitor chips with dimensions of 1.2 mm (width)×1.2 mm (thickness)×2.0 mm (length), fired at a temperature of 750° C. in a nitrogen atmosphere to prepare test pieces, and the film thickness at the ends were measured. In addition, the end faces of the coated chips were examined for sag and rated as acceptable (OK) or unacceptable (NG). The paste compositions and evaluation results are shown below in Table 1.

TABLE 1

|  |  |  | EX 1 | EX 2 | EX 3 | CE 1 | CE 2 | CE 3 |
|---|---|---|---|---|---|---|---|---|
| Organic vehicle 1 | Resin |  | MMA | MMA | MMA | — | — | — |
|  | Weight-average molecular weight | ×10,000 | 120 | 120 | 120 | — | — | — |
|  | Polymer amount | % | 22 | 22 | 22 | 0 | 0 | 0 |
| Organic vehicle 2 | Polymer |  | MMA | MMA/BMA | BMA | MMA | MMA |  |
|  | Weight-average molecular weight | ×10,000 | — | 20 | 15 | 68 | 20 | 20 |
|  | Polymer amount | % | 0 | 22 | 22 | 22 | 22 | 22 |
| Paste | Organic vehicle 1 | % | 30 | 15 | 15 | 0 | 0 | 0 |
|  | Organic vehicle 2 | % | 0 | 10.5 | 10.5 | 30 | 30 | 16.7 |
|  | Glass | % | 7 | 7.5 | 7.5 | 7 | 7 | 8.3 |
|  | Copper powder | % | 63 | 67 | 67 | 63 | 63 | 75 |
|  | Solids content | % | 70 | 74.5 | 74.5 | 70 | 70 | 83.3 |
|  | Polymer content | % | 6.6 | 5.61 | 5.61 | 6.6 | 6.6 | 3.674 |
| Results | Film thickness | μm | 75 | 89 | 88 | 76 | 73 | 121 |
|  | End face sag |  | OK | OK | OK | NG | NG | OK |

MMA: methyl methacrylate
BMA: butyl methacrylate

It is apparent from the results in Table 1 that in Examples 1 to 3 according to the invention, each of which includes a type and amount of methyl methacrylate which satisfies the conditions set forth in claim 1, sagging of the paste was not observed on the end faces (OK), and the film thickness was less than 90 microns. By contrast, in each of Comparative Examples 1 to 3, either the film thickness was greater than 90 microns or sagging of the paste was observed on the end faces of the coated chip (NG).

What is claimed is:

1. A multilayer capacitor utilizing an electrically conductive paste fireable in a neutral or reducing atmosphere comprising (a) 30 to 71 wt % conductive powder being selected from the group of copper powder, nickel powder and copper-nickel alloy powder and
   (b) an inorganic binder, both dispersed in an inert organic medium;
   wherein the organic medium comprises at least one methyl methacrylate (MMA) polymer dissolved in solvent, said methyl methacrylate polymer having a number-average molecular weight of at least 100,000 and a weight-average molecular weight of at least 1,000,000, such that the methyl methacrylate polymer accounts for 2.0 to 9.0 wt % of the paste, wherein the amount of the inorganic binder is in the range from 5 to 15 wt %, wherein the inorganic binder is selected from Si—B—Ba glass, Si—B—Pb glass, Si—B—Zn glass, or mixtures thereof and the conductive powder and inorganic binder combined is in the range from 45.0 wt % to 76 wt %.

2. The multilayer capacitor of claim 1 wherein the organic medium further comprises ethyl methacrylate, butyl methacrylate, copolymers of acrylate compounds, or mixtures thereof.

* * * * *